Patented June 17, 1930

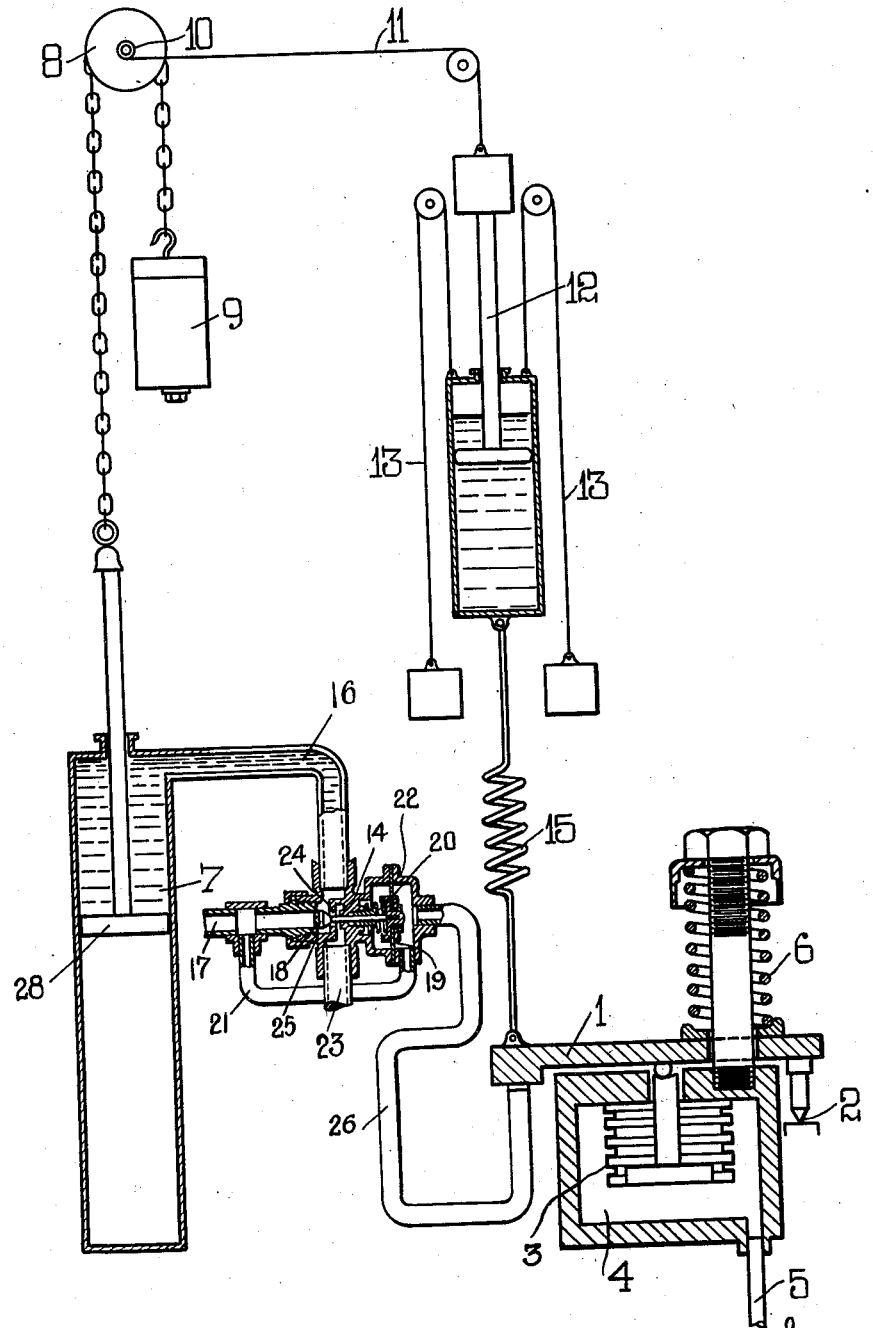

1,764,536

UNITED STATES PATENT OFFICE

FRANK EWART SMITH, OF BILLINGHAM, STOCKTON-ON-TEES, ENGLAND, ASSIGNOR TO IMPERIAL CHEMICAL INDUSTRIES LIMITED, OF LONDON, ENGLAND, A BRITISH COMPANY

AUTOMATIC REGULATOR

Application filed June 15, 1927, Serial No. 199,030, and in Great Britain June 21, 1926.

The present invention relates to improvements in automatic regulation apparatus of the type in which the movement of a control element due to the alteration of some physical characteristic such as pressure, temperature or the like operates the displacement of a machine part such as a valve through servo motor or the like relay apparatus.

It is often desirable in gear of this type to allow for the inherent inertia of the apparatus under automatic control, that is to say that if the apparatus under control is for instance a boiler plant, then on reduction of steam pressure, fuel must be fed to the furnaces at a greater rate but time must be allowed for the partial consumption of this before the automatic control is called upon again to function and operate the further increase in the rate of fuel supply. It is also necessary that the automatic device shall respond to small alterations in the governing characteristic, namely steam pressure in the example given above.

A form of control apparatus in general use comprises a control device sensitive to changes in a characteristic such as temperature pressure, volume, or the like which operates the displacement of a machine part directly through a servo-motor.

Such devices have the disadvantage that a rapid alteration in the governing characteristic such as a rapid drop in boiled steam pressure by way of example, causes a greater displacement of the machine part than is eventually required as the alteration in characteristic, that is to say in this case the lower steam pressure, persists long after adequate steps have been automatically taken to compensate therefor.

With the object of avoiding such over correction in control apparatus means are according to this invention provided whereby a negative force is applied to the control element against the force released thereto the alteration in characteristic, which negative force constantly decreases in value at a predetermined rate.

The invention is more particularly described with reference to the diagrammatic drawings accompanying the specification which shows an application of the invention to a boiler furnace control apparatus taken by way of example.

Boiler steam pressure is applied to the casing 4 through pipe 5 and operates the contraction or expansion of the diaphragm 3 the pin of which engages a lever 1 pivoted at 2 and provided with an adjustable spring loading 6.

The end of the lever 1 is formed as a valve controlling leakage of fluid from a pipe connected to a pilot valve on the hydraulic cylinder 7 which by means of the pilot valve 14 is placed either in connection with a supply of water at a constant pressure or with the drain.

The pilot valve 14 is constructed and operates as follows:—

The upper end of the hydraulic cylinder 7 communicates with the valve by a pipe 16. The valve consists of a casing 14 in the interior of which opens a pipe 17 through which water may be supplied under pressure to the valve.

The pipe 17 is controlled by the plunger 18 which is rigidly connected to the diaphragm 19 secured in the casing 14 and actuated by a spring 20. The pipe 17 is connected with the pipe 16, and with a pipe 21 communicating with chamber 22 to the rear of the diaphragm 19.

The pipe 16 may also be put into communication with the waste pipe 23 through the opening 24 in a portion 25 of the valve casing.

The leak pipe 26 is also connected to the chamber 22.

Through the supply pipe 17 pressure water continuously flows into the valve 14 and flows away through the waste pipe 23, being continuously admitted to the cylinder 7 by means of the pipe 16, where it produces a pressure which tends to move the piston downwards, which pressure is balanced by the counterweight 9.

Pressure liquid simultaneously flows through the pipe 21 into the leak pipe 26 from which it escapes.

When the element 1 falls on account of a diminution in steam pressure, the rate of leak from 26 is decreased and simultaneously the pressure against the diaphragm 19 in the chamber 22 is increased.

The diaphragm then moves under the action of the spring 20 a little to the left, thereby tending to check the supply of pressure liquid from the pipe 17 and at the same time to increase the rate of escape of liquid from the outflow pipe 23.

The liquid therefore tends to escape from the cylinder and the piston 28 to rise.

Similarly when the steam pressure increases, the piston 28 tends to fall.

Alteration in liquid level in the hydraulic cylinder 7 therefore causes rotation of a machine part 10 by means of chain and counterweight 9. The chain passes over a sprocket wheel 8 non-rotatably mounted on the part 10 so that movement of the chain produces corresponding rotation of the part 10.

The apparatus so far described is well known. In one form of construction according to this invention displacement of the machine part 10, or it may of course be the displacement of the servo-motor element 7 operates the displacement of a flexible cord 11 connected to the piston of a dash pot or the like adjustable time lag element 12, the cylinder of which is counterbalanced by cords and weight means 13. The cylinder is connected directly to a spring or the like energy starting means 15 in turn connected to the lever 1 of the control element.

If now in the above described arrangement the lever 1 moves down on to the pipe due to say a rapid drop in boiler steam pressure then an equally rapid displacement, or substantially so, is produced of the servo-motor element 7 and thereby of the machine part 10 which operates directly the feeding of more fuel to the furnaces. In the case for instance of oil fired furnaces, the element 10 may be the valve spindle of the fuel burner.

In the absence of other control parts the fuel supply would be maintained at the new valve for a longer period of time than necessary, which would later operate an excessive shutting down of the control element 1. Such instability or over correction conditions are however avoided as any rapid displacement of the element 7 causes a positive displacement of the dash pot as a whole and an extension of the spring 15 so that a negative loading is placed on the element 1 against the positive loading of spring 6.

The valve therefore will be held open and only allowed to close gradually upon the pipe according to a time factor depending on the dashpot leakage past its piston. At the same time the element 10 will be immediately responsive to delicate alterations in position of the element 1 as these will be within the minimum time factor of the dashpot 13.

My invention also includes the case when the spring 15 and/or the dashpot 13 are replaced by equivalent mechanism. For instance, the spring may be replaced by any device producing a force increasing with the travel of the main valve 8, and the dashpot may be replaced by electro-magnetic devices adapted to cause the proper lag.

I declare that what I claim is:—

1. An automatic control apparatus comprising an element displaceable according to the variations of pressure, temperature or volume, a machine part controlling said pressure, temperature or volume, a relay mechanism through which said element operates said part, an extensible spring and a dash-pot transmitting the displacement of said part to said element, said dash pot allowing said spring to gradually return to its normal loading after a predetermined time period.

2. An automatic means for controlling steam pressure in a boiler comprising an element displaceable by variations in the steam pressure, a fuel supply means, a servo-motor regulating said means and controlled by said element and a connection including a dash pot and spring between said servo-motor and said element.

3. An apparatus for automatic control of pressure, temperature or volume, comprising an element displaceable by variation in said pressure, temperature or volume, a leak-pipe controlled by said element, a pilot valve connected to and controlled by said leak pipe, a servo-motor controlled by said valve, and a connection, including a dash pot and spring, between said servo-motor and said element.

4. An automatic means for controlling the steam pressure in a boiler, comprising a lever displaceable by alterations in said steam pressure, a fuel feeding valve, a means for opening and closing said valve, operated by the displacement of said lever, and a spring and dashpot connected to said lever and said valve, and adapted to oppose the displacement of said lever.

5. An automatic means for controlling the steam pressure in a boiler, comprising a lever displaceable by alterations in said steam pressure, a fuel feeding valve, a hydraulically operated means for opening and closing said valve, operated through a pilot valve by the displacement of said lever, and a spring and dash-pot connected to said lever and said valve, and adapted to oppose the displacement of said lever.

In witness whereof, I have hereunto signed my name this 1st day of June, 1927.

FRANK EWART SMITH.